Figure 1:
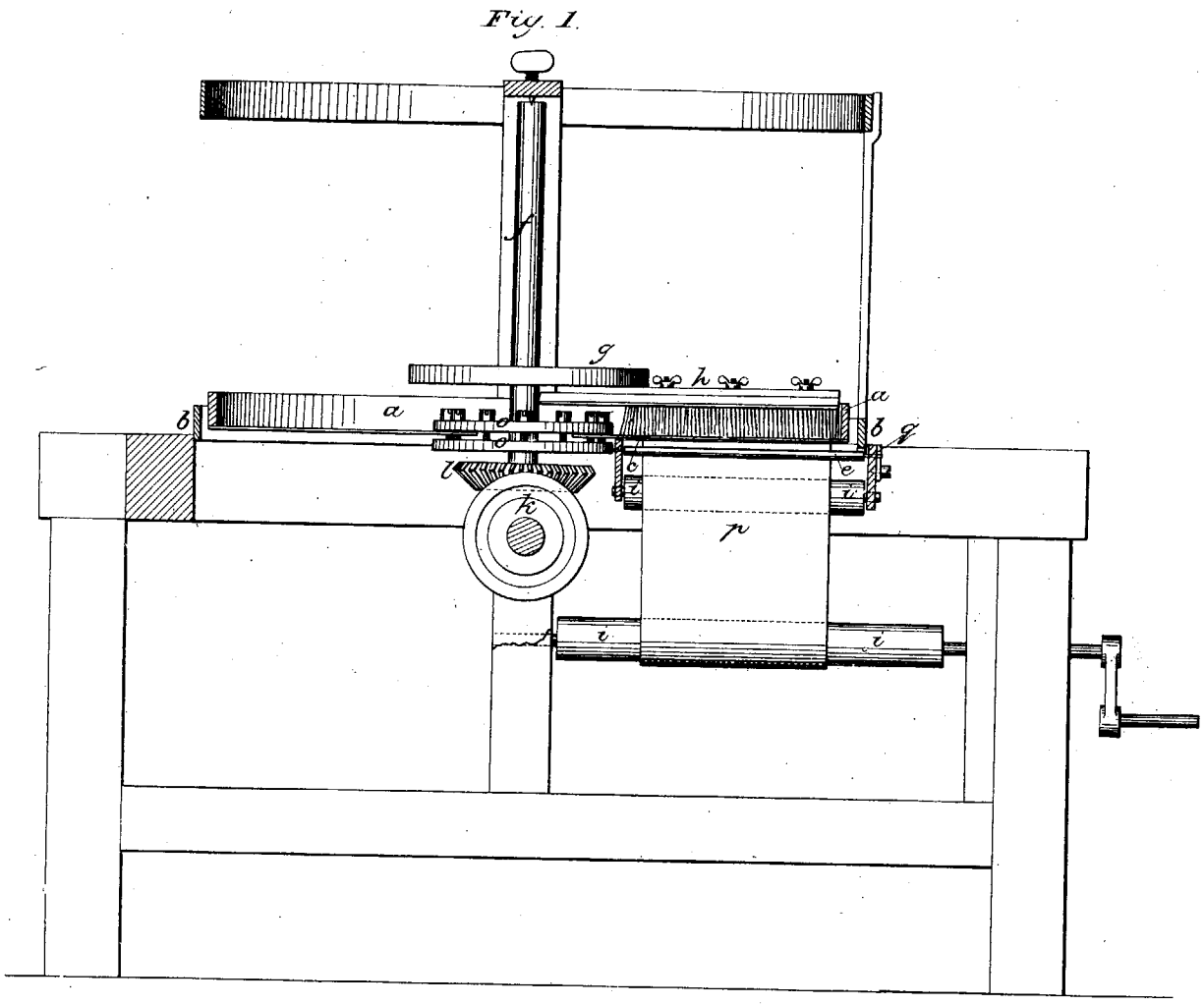
Figure 2:
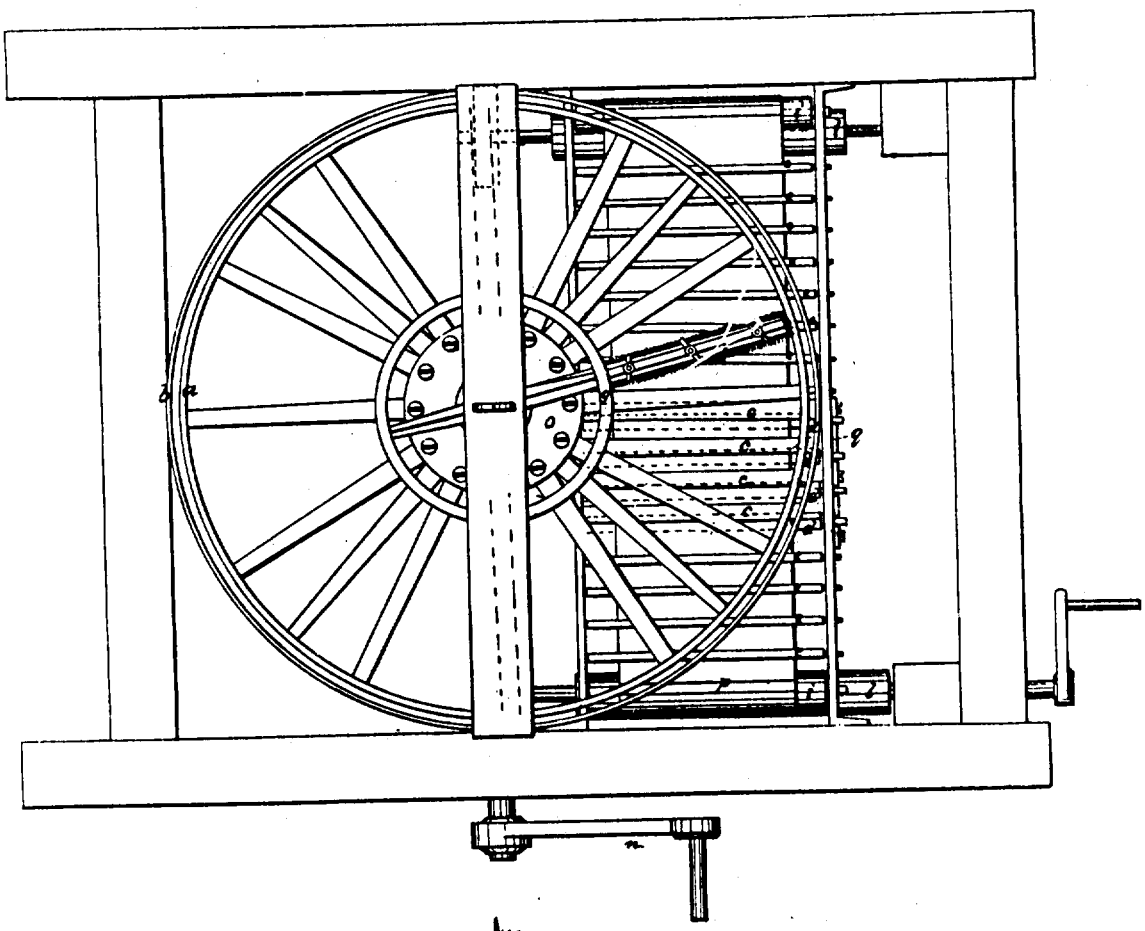
Figure 3:
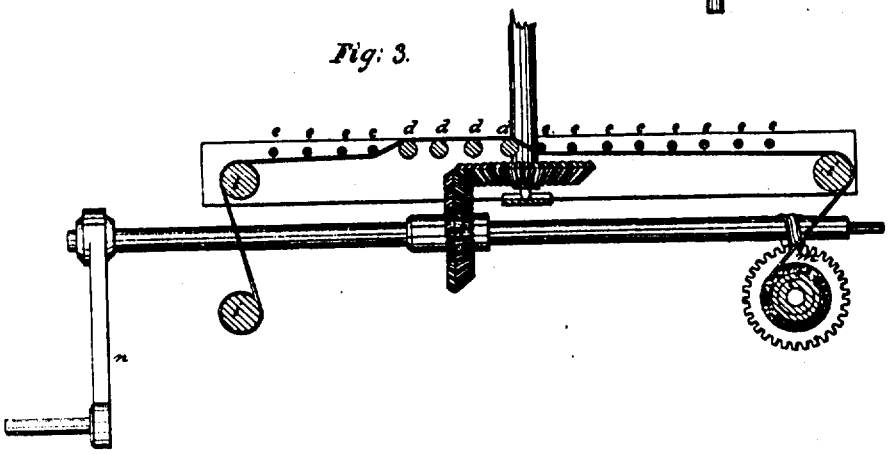

No Printed Specification Available

46X

S. G. DORR.

CLOTH SHEARING MACHINE.

Patented Oct. 20, 1792.

THE NORRIS PETERS CO., PHOTO-LITHO., WASHINGTON, D. C

46X

Sheet 2. 2 Sheets.

S. G. Dorr.

Cloth Shearing Mach.

Patented Oct. 20, 1792.

Oct 20, 1792
Oct. 20. 1792 • 46x
41

The United States.

Dated Oct. 20 1792.

To all to whom these presents shall come. Greeting

Whereas Samuel G Dorr of the City of Albany in
the State of New York, hath presented a petition to the Secretary of
State, the Secretary for the Department of War, and the Attorney Gener-
al of the United States, alleging and suggesting that he hath invented
a machine denominated "the wheel of Knives" for raising and shearing
the Knap of cloths, with less labor than is requisite in the ordina-
ry mode. That is to say a wheel having twelve spring knives regu-
lated by two metal wheels in a metal frame: consisting of three metal
posts placed within a wooden frame, and encompassed by two brass
rings having four tangent knives, so as that: in its revolution, the
[illegible] of each coming in contact, operate in the manner of shears.
In the said brass rings are also placed four rollers having slides which
bring the cloth up to the said tangent knives, and twelve other
rollers to protect the cloth from injury of the wheel of knives. A
revolving shaft having a brush thereon is placed at the bottom of
the third wheel, so as on the one side to raise the knap of the
cloth for shearing, and on the other to brush off the flocks. within
about two inches of the bottom of the said three posts, are three
projecting pins of about three inches in length, in which are placed
two rollers. between these two rollers the cloth passes from a roller
placed under the same to the wheel of knives. The whole machinery
may be put in motion by the aid of one person, a winch and four
cog wheels, and may be worked either vertically or horizontally.

And whereas. the said Invention hath been deemed suffi-
ciently useful and important, These are therefore in pur-
suance of the act entitled "an act to promote the progress of useful
arts" to grant to the said Samuel G. Dorr, his heirs, adminis-
trators or assigns, for the term of fourteen years, the sole and exclu-
sive right and liberty of making, using, and vending to others, to be
used, the said invention, So far as the said Samuel G. Dorr
was the Inventor according to the allegations, and suggestions

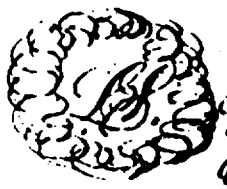

46X of the said Petition. In Testimony whereof I have caused
these Letters to be made Patent, and the Seal
of the United States to be hereunto affixed.
L.S. Given under my hand at the City of Philadelphia
this twentieth day of October in the Year of our Lord
One thousand seven hundred and ninety two, and of
the Independence of the United States of America the
seventeenth.

Go: Washington.
By the President
Th: Jefferson.

City of Philadelphia 20th October 1792.
I do hereby certify that the foregoing Letters Patent were delivered
to me in pursuance of the act entitled "An Act to promote the
progress of ... useful arts" that I have examined the same
and find them conformable to the said act.

Edm: Randolph.
[illegible] Attorney General of the U.S.

(882 [illegible])